United States Patent [19]
de Lange

[11] 4,273,364
[45] Jun. 16, 1981

[54] BRANCH PIECE

[75] Inventor: Tinus de Lange, Vroomshoop, Netherlands

[73] Assignee: Wavin B.V., Em Zwolle, Netherlands

[21] Appl. No.: 28,829

[22] Filed: Apr. 10, 1979

[30] Foreign Application Priority Data

Apr. 10, 1978 [NL] Netherlands .......................... 7803785

[51] Int. Cl.³ ............................................. F16L 41/00
[52] U.S. Cl. ..................................... 285/197; 285/421
[58] Field of Search ............... 285/197, 373, 419, 421; 138/99

[56] References Cited

U.S. PATENT DOCUMENTS

| | | | |
|---|---|---|---|
| 624,770 | 5/1899 | Eibee | 138/99 |
| 2,690,193 | 9/1954 | Smith | 285/373 X |
| 3,181,900 | 5/1965 | Hayward, Jr. | 285/243 |
| 3,231,298 | 1/1966 | Tomb et al. | 285/373 X |
| 3,350,755 | 11/1967 | Hanner | 138/99 X |
| 3,918,748 | 11/1975 | Acda | 285/197 X |
| 4,108,480 | 8/1978 | Ettema | 285/197 |
| 4,109,944 | 8/1978 | Curtin | 285/373 |

FOREIGN PATENT DOCUMENTS 2260929 6/1974 Fed. Rep. of Germany .......... 285/373

*Primary Examiner*—Thomas F. Callaghan
*Attorney, Agent, or Firm*—Wigman & Cohen

[57] ABSTRACT

A branch piece for pipe-lines comprising a first part and a second part for forming a cylindrical housing, each of the two parts being provided with a coupling edge for engaging a connecting or closing part. The parts are provided with wedge-shaped tongues which fit in complementary wedge-shaped recesses in the other parts.

6 Claims, 3 Drawing Figures

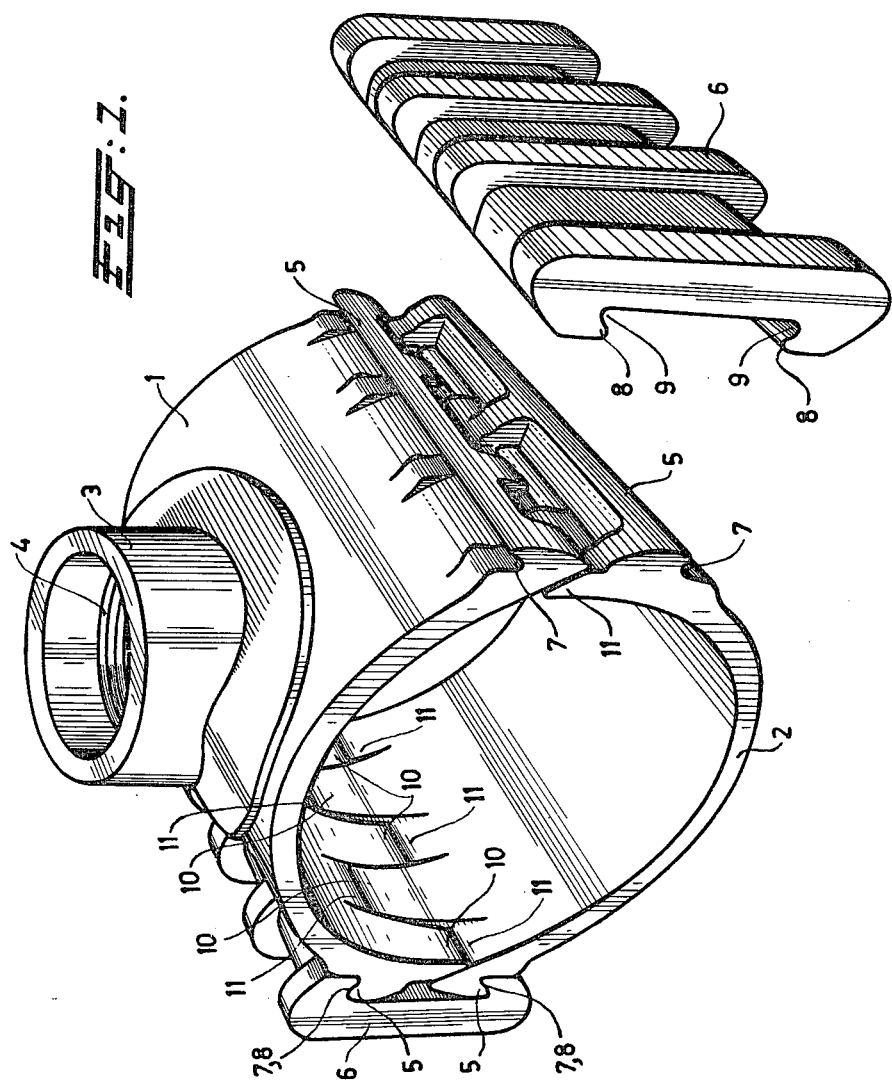

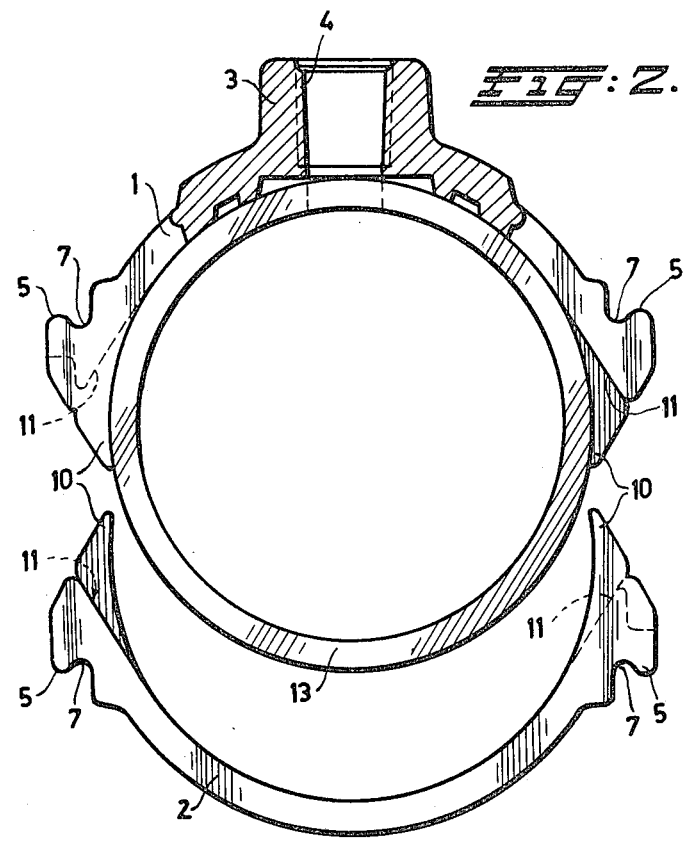
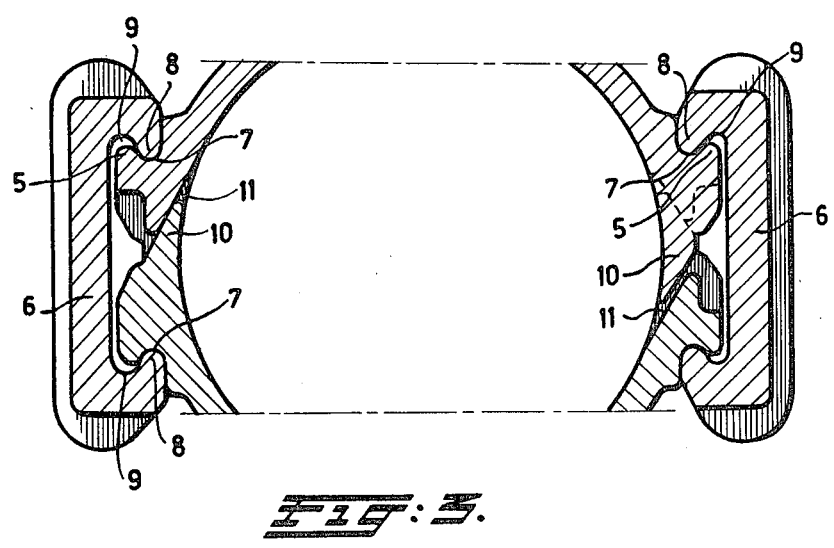

BRANCH PIECE

BACKGROUND OF THE INVENTION

The present invention relates to a branch piece for providing pipelines with branches, comprising a first part with a branch opening in a wall surface and a second part which together with the first part is adapted to surround a pipe-line, at least one part being provided with a projection in the vicinity of a coupling edge, adapted to support a connecting means, which projection is adapted to fit in a recess of the other part in the vicinity of the coupling edge of same and also adapted to co-operate with said connecting means.

A branch piece of this type is known per se and in that case the projection is a cam which after accomodation in the recess serves to avoid a sliding of the parts with respect to one another, when a C-shaped connecting piece is applied. One end of said connecting piece is narrower than the other end and the coupling edges of the parts are shaped in a corresponding manner in order to obtain wedge surfaces.

It has been found in practice that these known branch pieces—even if they are not provided with a cam—may cause a considerable deformation of the pipe-line when fitting the connecting pieces.

SUMMARY OF THE INVENTION

The present invention aims to provide a branch piece causing a deformation of the pipe-line to be as small as possible, by having a transition between the first and the second parts made as homogeneous as possible. It is a further aim of the invention to have the branch piece made so that it can be easily manufactured.

In accordance with the invention this is achieved in that a branch piece as described hereinbefore comprises a projection having the shape of a wedge-shaped tongue and in that the recess interacting therewith presents a complementary wedge-shape.

In accordance with the invention it has now been proved possible to obtain a proper surrounding or clamping of the pipe-line in the vicinity of the connecting pieces since, according to the invention, the tongues and recesses transversely extending along a cylindrical housing formed by the two parts, as described hereinbefore, are wedge-shaped.

Not only a good clamping action onto the pipe-line is obtained by the abovementioned feature, but the relative branch piece is easily manufactured, for example, by injection-moulding, whereby points or so-called injection fingers remain upon the parts. After the removal of the parts so obtained from the mould, said points or fingers may be passed along a sawing or other cleaning machine in order to remove the excess flash plastic material. In certain circumstances it is desired to provide a pipe-line with a cross branch; in this instance two first parts with a branch opening engage each other. The desired cross branch can be obtained by turning the two first parts 180° with respect to one another and the tongues will then fit in corresponding recesses since, according to the invention, each first part comprises at one connecting edge an even number of tongues and an uneven number of recesses, whereas the other coupling edge comprises an uneven number of tongues and an even number of recesses. The tongues and recesses are positioned symmetrically with respect to the centre of the two first parts in the axial direction of the two first parts.

The branch piece according to the invention is easily applied onto a pipe-line in that the tongues are wedge-shaped, and thus possesses a great resiliency, which enables the tongues to extend relatively far beyond the centre of the pipe.

In a branch piece in accordance with the invention, preferably the circumferential extent of an arc formed by each part is greater than 180° of the arc, while the chord between the tops of the tongues is less than the diameter of the arc.

In accordance with the invention a good homogeneous closure of the branch piece in the vicinity of the connecting parts is also obtained in that the coupling edges engaging a connecting piece are provided with a groove, the bottom of said groove supporting the wedge-surface of a connecting piece. Said groove extends in the closing direction of the parts above the roots of the tongues and the entrance of the recesses.

When two first parts are used, a rotation of 180° of one first part with respect to the other part is rendered possible. By shaping the branch piece so, the grooves will extend slantingly and will correspond to the wedge-surface of the connecting piece in the longitudinal direction of the part. The slope of the grooves on opposite sides in each separate part will be identical.

BRIEF SURVEY OF THE DRAWINGS

FIG. 1 shows a perspective view of a branch piece in accordance with the invention with a detached connecting piece;

FIG. 2 shows a side view, partially in cross-section, of a first part applied onto a pipe-line and a second, detached, part of a branch piece; and FIG. 3 shows a partial axial cross-sectional view of the branch piece with connecting pieces.

DESCRIPTION OF A PREFERRED EMBODIMENT

FIG. 1 shows a first part 1 and a second part 2 in their mounting position. The first part 1 is in a manner known per se, provided with a branch pipe 3 comprising an internal threading 4, for mounting a branch line.

Either side of both the part 1 and the part 2 is provided with coupling edges 5 which co-operate with connecting pieces 6. The edges 5 form a groove 7 at the periphery of the parts 1 and 2. The grooves 7 extend slantingly and a wedge surface is alternately formed by a groove 7 of the first part 1 and a groove 7 of the second part 2 at the same side. The wedge-surface interacts with an edge 8 of a connecting piece 6. A rearwardly extending part 9 located behind the edge 8 of the closing piece, does not come into contact with the coupling edges 5, for reasons to be described hereinafter.

As can be clearly seen in FIG. 1, the second part 2 possesses two tongues 10 which fit in recesses 11 of the part 1. The part 1 possesses three tongues 10 which fit in corresponding recesses 11 of the second part 2. The latter is shown more clearly in the side view in FIG. 2. In FIG. 2 it can be clearly seen that the tongues 10 are wedge-shaped, according to the cross-section of a cylindrical housing formed by the first and second parts 1 and 2. In an identical manner the recesses 11 have a complementary wedge-shape. It can also clearly be seen in this Figure that the tongues extend relatively far beyond the center of the pipe-line. The distance between two opposite tongues 10 of the parts 1 or 2, as shown in the plane of the drawing, is also considerably smaller than two times the radius of an arc formed by a part, e.g., the outer diameter of a pipe-line 13, onto which the branch piece has to be mounted.

As illustrated in FIGS. 1 and 2 the recesses 11 may be bounded directly by the side edges of the tongues 10. A homogeneous division of the clamping force can also be obtained in the vicinity of the coupling edges 5 of the first and second parts 1 and 2, owing to the wedge-shape of the tongues 10 and of the recesses 11. Said wedge-shape of the points of the tongues 10 enables said points to be relatively thin so that they are capable of extending farther beyond the center of the pipe-line, thus avoiding any risk of damage when mounting the branch piece, since the tops of the tongues 10 are fixed at that location by means of a snapping action.

A good homogeneous distribution of forces is also obtained in that the grooves 7, as seen in the closing or connecting direction, are located practically above the roots of the tongues 10 and the entrance openings of the recesses 11. For that reason the edges 8 are mounted into the bottom of the grooves 7 whereas rearwardly extending part 9 does not come into contact with the coupling edges 5, as can be clearly seen in FIG. 3. When fixing the connecting pieces 6, a moment may be exerted upon the first part 1 and the second part 2 owing to the wedge action of the edges 8 in the grooves 7. So as to keep said moment as small as possible and in order to obtain an even distribution of the forces at right angles, being exerted by the first and second parts 1 and 2 upon the periphery of the pipe-line 13, the coupling edges 5 of the grooves 7 are kept apart from the connecting piece 6 because of the shape of the rearwardly extending parts 9. The remaining moment is evenly transmitted by the tongues 10. The surfaces of the tongues 10 are, therefore, adapted to the cylindric housings formed by the first and second parts 1 and 2, the radius of which corresponds to the outer radius of the pipe-line 13. When, for example, the second part 2 possesses two tongues 10 at one side, three recesses 11 are present therein, whereas the first part 1 located at the same side possesses two recesses 11 and three tongues 10. The second part 2 has three tongues 10 at the other side and two recesses 11, whereas the first part 1 possesses two tongues 10 at that side and three recesses 11. This enables two first parts 1 to be employed together, one first part 1 replacing the second part 2, being turned over 180°. The latter feature is, for instance, attended to, when the pipe-line 13 has to be provided with a cross branch section. The said turning over 180° of one first part 1 when two of the said first parts 1 are used, is also rendered possible because the slopes of the grooves 7 on opposite sides of each part are identical. If this sloping direction of the two grooves 7 would differ, a rotation over 180° of one first part 1 with respect to the other first part 1 could not possibly be performed since in the latter case a connecting piece 6 would no longer fit.

The parts 1 and 2 and connecting or closing piece 6 consist preferably of thermoplastic material.

What is claimed is:

1. A branch piece for providing pipe-lines with branches, comprising:
    a first part with a branch opening in a wall surface;
    a second part, together with the first part, adapted to surround a pipe-line;
    C-shaped means for connecting said first part and said second part together on the outside;
    each part being provided with axially spaced projections in the vicinity of opposite coupling edges adapted to support said connecting means;
    said projections being adapted to fit in axially spaced recesses of each part in the vicinity of said opposite coupling edges of each part and also being adapted to co-operate with said connecting means;
    wherein the projections have the shape of wedge-shaped tongues while the recesses interacting therewith have complementary wedge-shapes;
    wherein, in cross-section of a cylindrical housing formed by the two parts, said wedge-shaped tongues and recesses extend along the cylindrical housing;
    wherein the opposite coupling edges co-operating with the connecting means are provided with grooves, the bottom of said grooves being able to support the connecting means, said grooves being located in the closing or connecting direction of the cylindrical housing above the roots of the tongues and the entrances of the recesses; and
    wherein the grooves corresponding to a wedge-surface of the connecting means extend slopingly in the longitudinal direction of the cylindrical housing, said sloping direction of the grooves on each opposite side of each separate part being identical.

2. The branch piece of claim 1, wherein one coupling edge of each part comprises an even number of tongues and an uneven number of recesses whilst the other coupling edge of each part comprises an uneven number of tongues and an even number of recesses.

3. The branch piece of claim 1, wherein, as seen in the longitudinal direction, the tongues and the recesses are oriented symmetrically with respect to the center of the cylindrical housing.

4. The branch piece of claim 1, wherein the circumferential extent between tips of the tongues at the ends of an arc formed by each part is greater than 180° and the circumferential extent between the roots of the tongues is less than 180°.

5. The branch piece of claim 1, wherein the side edges of the tongues bound the recesses.

6. A branch piece as defined in claim 1, wherein one side of the tongues constitutes an extension of the cylindrical housing formed by the two parts.

* * * * *